(12) United States Patent
Sachson

(10) Patent No.: US 12,086,215 B2
(45) Date of Patent: Sep. 10, 2024

(54) USER-CONFIGURED MUSIC ROOM DIGITAL ASSETS IN VIRTUAL ENVIRONMENTS

(71) Applicants: Sony Group Corporation, Tokyo (JP); Sony Corporation of America, New York, NY (US)

(72) Inventor: Thomas Sachson, Culver City, CA (US)

(73) Assignees: Sony Group Corporation, Tokyo (JP); Sony Corporation of America, New York, NY (US)

( * ) Notice: Subject to any disclaimer, the term of this patent is extended or adjusted under 35 U.S.C. 154(b) by 186 days.

(21) Appl. No.: 17/859,331

(22) Filed: Jul. 7, 2022

(65) Prior Publication Data

US 2023/0037657 A1    Feb. 9, 2023

Related U.S. Application Data

(60) Provisional application No. 63/260,008, filed on Aug. 6, 2021.

(51) Int. Cl.
  *G06F 21/10*    (2013.01)
  *G06F 16/23*    (2019.01)
  (Continued)

(52) U.S. Cl.
  CPC .......... *G06F 21/10* (2013.01); *G06F 16/2379* (2019.01); *G06F 21/604* (2013.01);
  (Continued)

(58) Field of Classification Search
  CPC .... G06F 21/10; G06F 16/2379; G06F 21/604; G06F 16/444; G06F 21/1015;
  (Continued)

(56) References Cited

U.S. PATENT DOCUMENTS 7,840,903 B1    11/2010    Amidon
7,849,420 B1    12/2010    Amidon
(Continued)

FOREIGN PATENT DOCUMENTS

CN    112492328 A    3/2021
RU    88829 U1    11/2009

OTHER PUBLICATIONS

Holm J., Lehtiniemi A. (2011) A Virtual World Prototype for Interacting with a Music Collection. In: Ozok A.A., Zaphiris P. (eds) Online Communities and Social Computing. OCSC 2011. Lecture Notes in Computer Science, vol. 6778. Springer, Berlin, Heidelberg. https://doi.org/10.1007/978-3-642-21796-8_35.

*Primary Examiner* — Cheng-Feng Huang
(74) *Attorney, Agent, or Firm* — Procopio, Cory, Hargreaves & Savitch LLP

(57) ABSTRACT

Managing access to digital content in a virtual environment using virtual content rights, including: providing a virtual content rights database comprising data associating a user of the virtual environment with the virtual content rights acquired with respect to the digital content; receiving, at a processor, a request from a device of the user for assignment of the virtual content rights of the digital content, wherein the user uses the device to interface with the processor; updating the virtual content rights database to indicate the assignment of the virtual content rights to the user; receiving, at the processor, data from the device of the user holding the virtual content rights to digital content including songs to create a virtual user-configured music room having at least one of the songs; and updating the virtual content rights database to indicate sharing of the virtual user-configured music room by the user within the virtual environment.

20 Claims, 6 Drawing Sheets

(51) Int. Cl.
*G06F 21/60* (2013.01)
*G06F 16/44* (2019.01)

(52) U.S. Cl.
CPC ........ *G06F 16/444* (2019.01); *G06F 21/1015* (2023.08); *H04L 2209/603* (2013.01)

(58) Field of Classification Search
CPC .... G06F 16/638; G06F 16/904; G06F 16/907; G06F 16/635; G06F 16/901; H04L 2209/603
See application file for complete search history.

(56) References Cited

U.S. PATENT DOCUMENTS

| | | | |
|---|---|---|---|
| 2009/0313556 A1* | 12/2009 | Hamilton, II | G06F 21/105 |
| | | | 715/757 |
| 2018/0107805 A1* | 4/2018 | Anantharaman | G06F 3/011 |
| 2019/0318060 A1* | 10/2019 | Brenner | H04N 21/8113 |
| 2020/0104522 A1* | 4/2020 | Collart | G06T 19/20 |
| 2020/0143012 A1* | 5/2020 | Tardelli | G06F 21/10 |

* cited by examiner

USER-CONFIGURED MUSIC ROOM DIGITAL ASSETS IN VIRTUAL ENVIRONMENTS

CROSS-REFERENCE TO RELATED APPLICATIONS

This application claims the benefit of priority under 35 U.S.C. § 119(e) of U.S. Provisional Patent Application No. 63/260,008, filed Aug. 6, 2021, entitled "User Configured Music Room Digital Assets in Virtual Environments". The disclosure of the above-referenced application is incorporated herein by reference.

BACKGROUND

Field

The present disclosure relates to creating, owning, transferring, and/or managing music-related digital assets, and more specifically, to creating, owning, transferring, and/or managing one or more music-related digital assets including user-configured music rooms and analogous music-related digital assets in a virtual environment.

Background

Currently, users can share songs and music videos, such as by sharing song titles or links to song files. User can also create, play, or transfer playlists of songs and/or music videos. However, playing or transferring a playlist of songs and/or music videos shares the song but is typically not an interactive experience for the recipient.

SUMMARY

In the present disclosure, a server system provides a virtual environment that presents audio and visual experiences to users by sending digital asset data to client systems for presentation to users and receiving data from users. Users can interact with different elements in the virtual environment and can create and modify elements in the environment.

One implementation includes one or more programmable processors and corresponding computer system components to store and execute computer instructions, such as to provide the server system and databases for storing and managing digital assets and user interactions.

Examples of implementations of creating, transferring, and managing digital assets are discussed on the following pages. One example of a digital asset used here are music rooms or galleries. In one implementation, a user can create multiple music rooms in a virtual environment. The user experiences the room in the virtual environment by accessing the room through a virtual environment avatar. In one implementation, a user avatar moves throughout and interacts with the environment based on user input and system data and the environment presents content to the user over time and position. In music rooms, a user can experience the content of music rooms by moving the user's avatar through the rooms and interacting with and observing the objects and presentation of the music rooms.

The user can configure and customize the experience of each music room and the collection. The user adds to each room digital assets and data such as songs, music videos, images, and information. The user selects and configures the shape and appearance of the music rooms. The user also selects and creates connections between and among rooms and other locations or experiences in the virtual environment, creating linear and non-linear experiences. The user can also share or transfer some or all of the music rooms with other users, and similarly share or receive music rooms from other users as well. In one example, a user avatar gives an object, such as a card of key, to another user avatar in the virtual environment to provide access to a music room or collection. The combination of features provides a user with a personal experience and expression in a virtual environment. The available experiences and expressions promote social interaction, content consumption and transactions, and content sharing and discovery.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
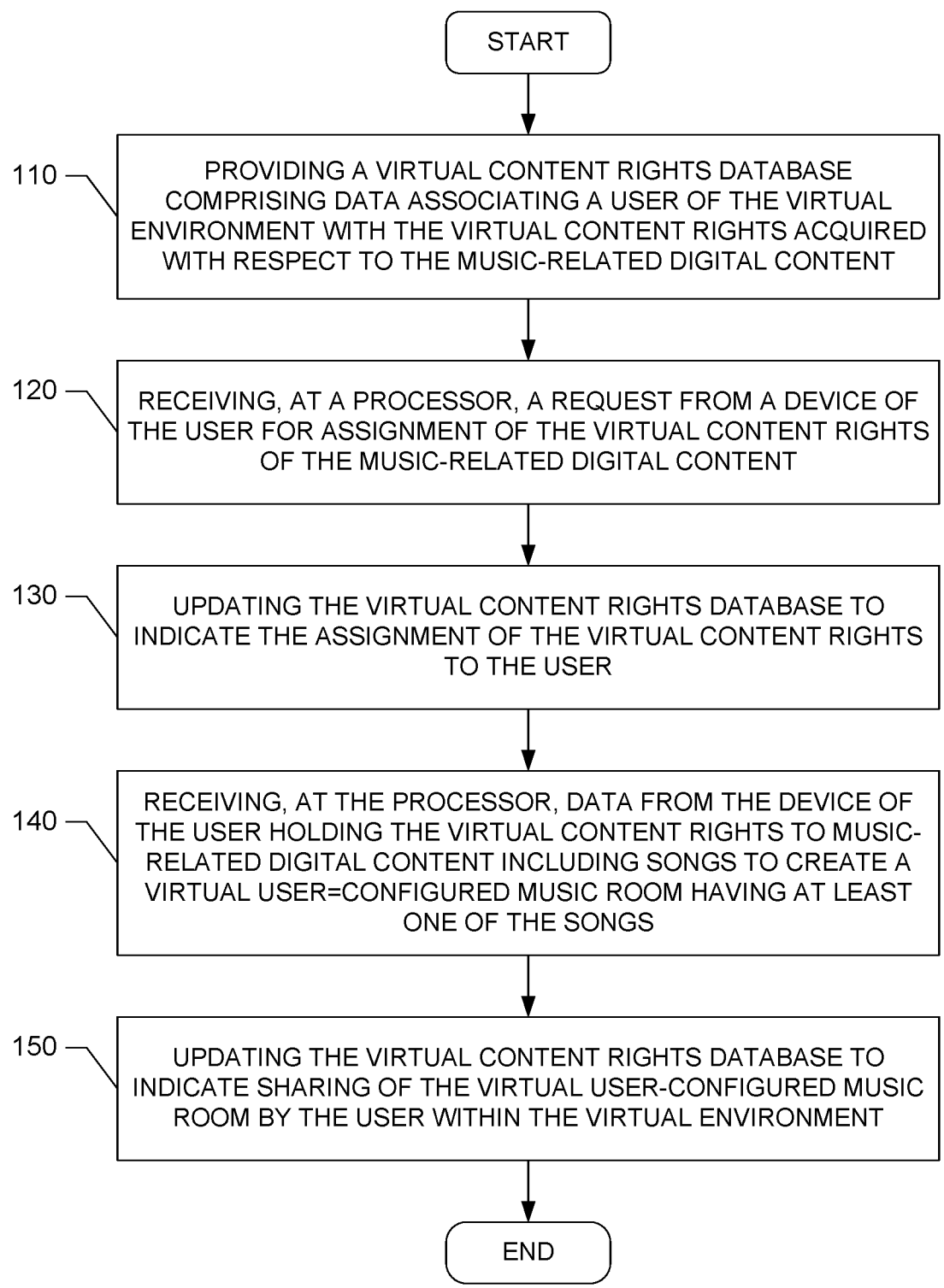
FIG. 1 is a flow diagram of a method for managing access to music-related digital content in a virtual environment using virtual content rights in accordance with one implementation of the present disclosure.

As described above, playing or transferring a playlist of songs and/or music videos fails to provide meaningful interactions or relationships among users, and/or between users and virtual environment.

Certain implementations of the present disclosure include: creating music-related digital assets (such as user-configured music rooms and analogous music-related digital assets) which are content aggregations represented as unique virtual environment objects; sharing the music-related digital assets (such as user-configured music rooms and analogous music-related digital assets) including, among others, transferring, lending, renting, selling, copying, and combining the music-related digital assets (such as user-configured music rooms and analogous music-related digital assets); and exposing music-related digital assets (such as user-configured music rooms and analogous music-related digital assets) including displaying, playing for others in virtual environment areas, and discovery through music-related digital assets (such as user-configured music rooms and analogous music-related digital assets) relationships. After reading the above descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, a virtual environment provides users with virtual objects. Further, the users can interact in the virtual environment visually (e.g., observing objects, writings, and visual art) and aurally (speech, sounds). That is, the users can see and interact with objects in the environment.

In one implementation, the users can create user-configured music rooms (or analogous music-related digital assets) by using pre-configured digital assets representing musical items (sounds, text, images, video, interactive elements, and analogous), pre-configured digital assets representing non-musical items (sounds, text, images, video, interactive elements, and analogous), pre-configured digital assets representing virtual building items (walls, floors, ceiling, stairs, doors, windows, shelves, picture frames, roofs, wallpaper, paint, lighting fixtures, and analogous), and pre-configured digital assets representing virtual physical space connectors (portals, doors, pathways, and analogous) that are all selected by the user in whole or in part to construct, assemble, and/or configure one or more conjoined and customized virtual music room environments. For example, a collection of music rooms can act as a three-dimensional, physically represented music mix tape, where each virtualized physical space is dedicated to one or more content types of experience, and where each such user-configured space is analogous to the placement of a song (or songs) on a traditional mix tape that a user might create themselves or their friends and play in the physical world. Further, such user-configured music rooms can be "played" by the user by moving through the three-dimensional virtual space (perhaps via their virtualized avatar walking, running, floating, teleporting, or analogous), and where the user may also pause the user-configured music room experience, go through the user-configured music room experience backwards, and/or go through the user-configured music room experience in a linear and/or non-linear fashion. (See FIGS. 4-6.)

The virtual environment system can provide additional features, configurations, and processes for using and managing music rooms, including, but not limited to:

(a) Users and the platform administrator may also choose to integrate ad features in their own user-configured rooms;

(b) Users and the platform administrator may also choose to integrate digital merchandise sales features in their own user-configured rooms;

(c) Users and the platform administrator may also choose to integrate physical merchandise sales features in their own user-configured rooms;

(d) Users and the platform administrator may also choose to integrate social networking (Facebook®, Twitter®, TikTok®) features in their own user-configured rooms;

(e) Users and the platform administrator may also choose to integrate peer-to-peer or group communication (text, chat) features in their own user-configured rooms;

(f) Users and the platform administrator may also choose to integrate gaming and mini-game features in their own user-configured rooms;

(g) Users and the platform administrator may also choose to integrate reward features in their own user-configured rooms;

(h) Users and the platform administrator may also choose to create invitations to share rooms or collections of rooms and send or provide the invitations to other users; and (i) Users and the platform administrator may also choose to create layered or tiered digital assets, allowing a digital asset to contain another asset or have an asset associated as a sub-asset. For example, a music video asset can include a song asset and an artist image asset, and the song asset can include a lyrics asset. In another example, a music room asset can include one or more sub-rooms, which can each further include sub-rooms, etc. The assets in the layers can be configured together or separately.

To create an original music-related digital asset including a user-configured music room or analogous music-related digital assets, a user selects one or more songs and/or music videos (in whole or in part), arranges them in an order if need be, selects a name and appearance of the music-related digital asset, and creates a corresponding music-related digital asset, including a user-configured music room or analogous music-related digital asset, object to complement the selections. To create a derived music-related digital asset including a user-configured music room or analogous music-related digital asset, the user selects at least one item in another music-related digital asset including another user-configured music room or analogous music-related digital asset and adds zero or more additional items, original selections, or other digital items from other music-related digital assets.

In other implementations, the users can perform the following with the music-related digital assets including user-configured music rooms and analogous music-related digital assets: display the music-related digital assets objects in locations, such as virtual or physically real housing, shops, libraries, or publish them for others to see; play the music-related content emanating from the digital assets for other users to be heard by specific users or by location/proximity (e.g., playing a music-related digital asset in a user rooms so that all users near the rooms can hear the music); inspect and access the music-related digital assets of other users, according to access settings; and/or share the music-related digital assets with other users, such as displaying, playing for others in virtual or physically real environment areas, and discovery through the music-related digital asset's relationship to the virtual or real physical environment. In one implementation, the system can provide music discovery by identifying common aspects of music playlists, music-related digital assets, particular songs and/or music videos, and environments.

In one implementation, a user holding the virtual content rights to selected songs and/or music videos creates the music-related digital assets (such as user-configured music rooms and analogous music-related digital assets) including the selected songs and/or music videos by buying blank virtual rooms materials (e.g., represented by virtual building materials such as walls, roofing, floors, doors, etc.) from a virtual environment store and placing the music-related digital assets together in such a manner as to create music rooms that may be virtually explored virtual spaces. In other implementations, the user can also add songs and/or music assets of other users (holding the virtual content rights to the songs and/or music videos being added) to the user's own created music-related music room by trading access to the user's own music-related digital assets for access to the music-related digital assets of the other users.

Once a music-related digital asset (such as a user-configured music room or analogous music-related digital asset) having a plurality of songs and/or music videos is completed, the owner of the music-related digital asset can replicate the music-related digital asset by copying the contents (e.g., the structure music room elements, as well as the inherent songs and/or music videos, videos, and other media contents) for use by another user of the platform. The owner is now free to sell, trade, or give away the replicated music-related digital asset to others within the virtual environment.

In the above music-related digital asset context, the following alternative implementations are possible. In one implementation, a user buys or creates artwork to add to the music-related digital asset (e.g., on the walls or anywhere on the inside or outside of the music-related digital asset), and possibly copying the artwork to other music-related digital assets. In another implementation, a user is able to copy the music-related digital assets (e.g., structure and contents) of other users freely, for a fee, or upon completion of a task requested or required by the virtual environment administrator or the creator of the music-related digital asset. In another implementation, the number of virtual song and/or music video rights is limited to a capped amount for each user to avoid content rights hoarding, or the number is set by the seniority of the user within the virtual environment (e.g., more advanced users have more capacity to hold rights to more songs and/or music videos). In another implementation, derivative, second generational music-related digital assets are created algorithmically or manually within such rooms by combining the contents of two separate music-related digital assets. In another implementation, the provenance or record of the history of content rights ownership of the music asset within a room is included within the music-related digital asset (e.g., showing both current and past content rights holders who may be contacted within the virtual environment). In another implementation, a given first music room associated with particular digital content (songs, artwork, meta data) may be programmatically linked and re-linked (e.g., via doors, portals, analogous transport mechanics) to other music rooms within the system so that a user gets a new experience each time they enter the original first room.

In another implementation, the virtual content rights held by a user may be lost if the rights are not exercised often enough by using the content asset within the virtual environment. This is similar to the "use it or lose it" concept in which the user either exercises the virtual content rights by using the content asset (e.g., sharing, listening to, making music-related digital assets including user-configured music room, etc.) or loses the virtual content rights. For example, in a game environment, this concept would make the user keep coming back to the game to keep the virtual content rights. In another implementation, the virtual content rights to one content asset are shared by multiple users within the virtual environment. In another implementation, the user simultaneously controls multiple content rights or a select few at a time. In this implementation, the number of content rights controlled by the user may be tied to the status level of the user, with the higher status conferring more advanced or more numerous virtual content rights. In another implementation, the user is rewarded more (with virtual rewards, points, status, etc.) when the user's content asset (i.e., the song to which the user holds the virtual content rights) is copied as part of a music-related digital asset including user-configured music rooms and analogous music-related digital assets or listened to more within the virtual environment. In another yet implementation, to copy a music-related digital asset in the virtual environment, the user copying the music-related digital asset is required to travel to an area of the virtual environment to affect a copying event (e.g., the user seeking to make a copy of a user-configured music room needs to have their personal avatar touch the user-configured music room to copy the artwork and/or the content asset properties).

FIG. 1 is a flow diagram of a method 100 for managing access to music-related digital content, such as songs and music videos, in a virtual environment using virtual content rights in accordance with one implementation of the present disclosure. In the illustrated implementation of FIG. 1, a virtual content rights database is provided, at block 110, wherein the database includes data associating a user of the virtual environment with the virtual content rights acquired with respect to the music-related digital content.

A request is received, at block 120, from a device of the user for assignment of the virtual content rights of the music-related digital content. In one implementation, the request is received at the processor and the user uses the device to interface with the processor. The virtual content rights database is then updated, at block 130, to indicate the assignment of the virtual content rights to the user. At block 140, data is received, at the processor, from the device of the user holding the virtual content rights to music-related digital content including songs and/or music videos to create one or more music-related digital assets (such as user-configured music rooms and analogous music-related digital assets) having at least one of the songs and/or music videos as the case may be. The virtual content rights database is then updated, at block 150, to indicate sharing of the one or more music-related digital assets by the user within the virtual environment. In one implementation, sharing of the one or more music-related digital assets includes at least one of transferring, lending, renting, selling, copying, and combining the one or more music-related digital assets including user-configured music rooms and analogous music-related digital assets. In one implementation, sharing of the one or more music-related digital assets including user-configured music rooms and analogous music-related digital assets includes at least one of displaying and playing for others in the virtual environment.

In one implementation, the method further includes receiving, at the processor, a request to buy a blank piece of virtual media or more music-related digital assets including user-configured music rooms and analogous music-related digital assets. In one implementation, the method further includes receiving, at the processor, a request to copy the one or more music-related digital assets including user-configured music rooms and analogous music-related digital assets having the at least one of the songs and/or music videos to the blank one or more music-related digital assets to produce a second generation one or more music-related digital assets. In one implementation, the method further includes sending permission to the user device that the user is now free to sell, trade, or give away the second generation one or more music-related digital assets to other users within the virtual environment. In one implementation, the virtual content rights for the music-related digital contents are held by other users and the songs and/or music videos included in the one or more music-related digital assets are owned by the other users. In one implementation, the method further includes deducting a set amount from an account of the user in a user account database for the use of the songs and/or music videos included in the one or more music-related digital assets owned by the other users. In one implementation, the music-related digital content included in the one or more music-related digital assets (such as user-configured music rooms and analogous music-related digital assets) further includes at least one of videos, audios, photos, and other media items to personalize the sharing of the one or more music-related digital assets including user-configured music rooms and analogous music-related digital assets. In one implementation, the one or more music-related digital assets including user-configured music rooms and analogous music-related digital assets includes at least one of artworks, logos, writings, and other items to personalize the sharing of the one or more music-related digital assets. In one implementation, the method further includes adding a set amount to an account of the user in a user account database for the use of the music-related digital content by other users, wherein the user holds the virtual content rights to the music-related digital content. In one implementation, the method further includes receiving, at the processor, a request from a device of the user to add songs and/or music videos of other users to the one or more music-related digital assets of the user by trading access to the songs and/or music videos owned by the user, wherein the other users hold the virtual content rights to the songs and/or music videos to be added.

In one implementation, a method for managing access to music-related digital content in a virtual environment using virtual content rights is disclosed. The method includes: providing a virtual content rights database including data associating a user of the virtual environment with the virtual content rights acquired with respect to the music-related digital content; receiving, at a processor, a request from a device of the user for assignment of the virtual content rights of the music-related digital content, wherein the user uses the device to interface with the processor; updating the virtual content rights database to indicate the assignment of the virtual content rights to the user; receiving, at the processor, data from the device of the user holding the virtual content rights to music-related digital content including songs and/or music videos to create one or more music-related digital assets including user-configured music rooms and analogous music-related digital assets having at least one of the songs and/or music videos; and updating the virtual content rights database to indicate sharing of the one or more music-related digital assets including user-configured music rooms and analogous music-related digital assets by the user within the virtual environment.

In one implementation, sharing of the virtual user-configured music room includes at least one of transferring, lending, renting, selling, copying, and combining the virtual user-configured music room. In one implementation, sharing of the virtual user-configured music room includes at least one of displaying and playing for others in the virtual environment. In one implementation, the method further includes receiving, at the processor, a request to buy a blank virtual user-configured music room. In one implementation, the method further includes receiving, at the processor, a request to copy the virtual user-configured music room having the at least one of the songs to the blank virtual user-configured music room to produce a second-generation virtual user-configured music room. In one implementation, the method further includes sending permission to the user device that the user is now free to sell, trade, or give away the second-generation virtual user-configured music room to other users within the virtual environment. In one implementation, the virtual content rights for the digital contents are held by other users and the songs included in the virtual user-configured music room are owned by the other users. In one implementation, the method further includes deducting a set amount from an account of the user in a user account database for the use of the songs included in the virtual user-configured music room owned by the other users. In one implementation, the digital content included in the virtual user-configured music room further includes at least one of videos, audios, photos, and other media items to personalize the sharing of the virtual user-configured music room. In one implementation, the virtual user-configured music room includes at least one of artworks, logos, writings, and other items to personalize the sharing of the virtual user-configured music room. In one implementation, the method further includes adding a set amount to an account of the user in a user account database for the use of the digital content by other users, wherein the user holds the virtual content rights to the digital content. In one implementation, the method further includes receiving, at the processor, a request from a device of the user to add songs of other users to the virtual user-configured music room of the user by trading access to the songs owned by the user, wherein the other users hold the virtual content rights to the songs to be added.

Figure 2:
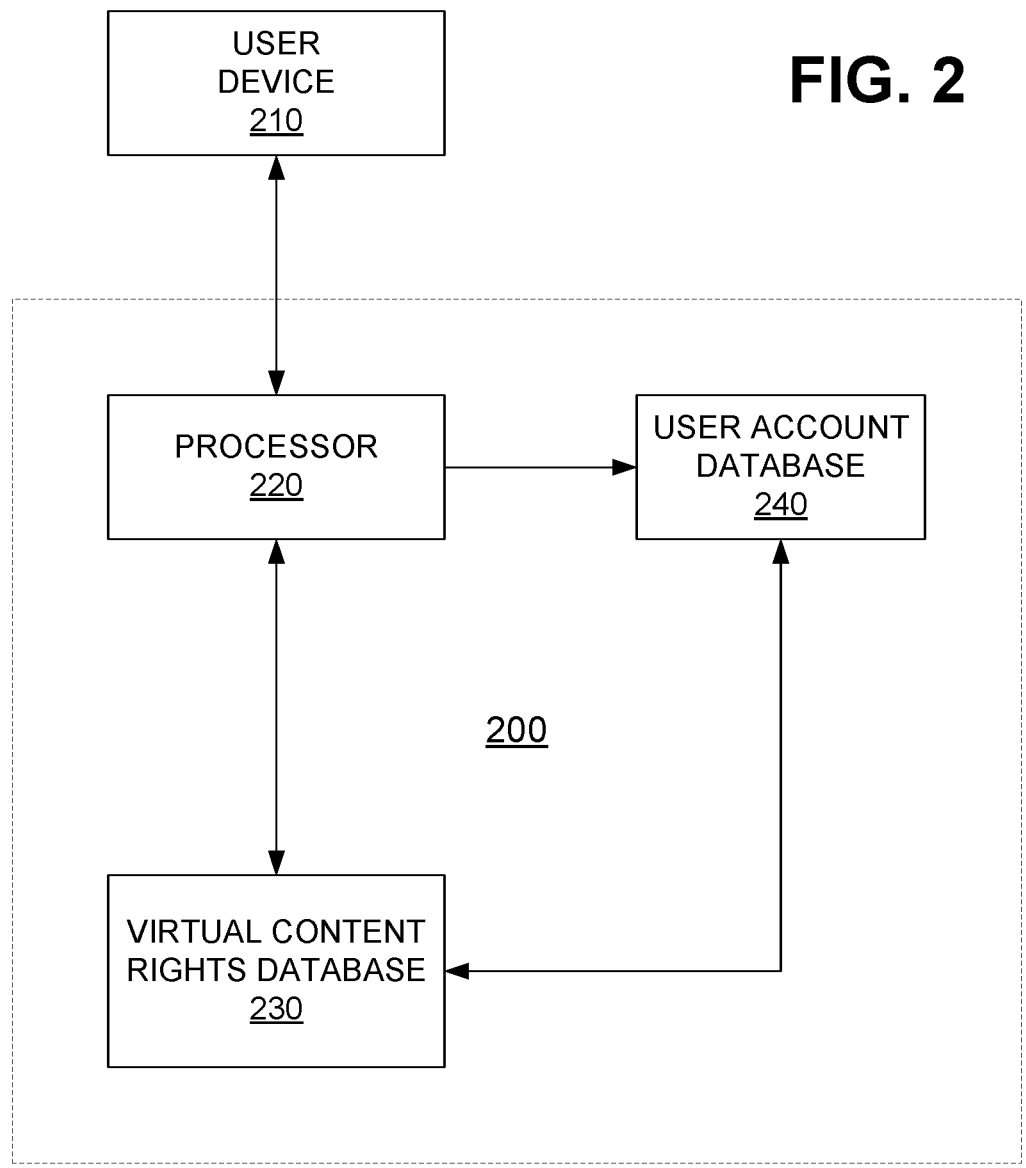
FIG. 2 is a block diagram of a system for managing access to music-related digital content in a virtual environment using virtual content rights.

FIG. 2 is a block diagram of a system 200 for managing access to music-related digital content in a virtual environment using virtual content rights in accordance with one implementation of the present disclosure. The system 200 includes a processor 220, a virtual content rights database 230, and a user account database 240.

In the illustrated implementation of FIG. 2, the virtual content rights database 230 includes data associating a user of the virtual environment with the virtual content rights acquired with respect to the music-related digital content. The processor 220 receives a request from a device 210 of the user for assignment of the virtual content rights of the music-related digital content. The user uses the device 210 to interface with the processor. The virtual content rights database is updated to indicate the assignment of the virtual content rights to the user. The processor 220 also receives data from the device 210 of the user holding the virtual content rights to music-related digital content including songs and/or music videos to create a one or more music-related digital assets having at least one of the songs and/or music videos. The virtual content rights database 230 is then updated to indicate sharing of the one or more music-related digital assets by the user within the virtual environment.

In one implementation, the processor 220 receives a request to copy the one or more music-related digital assets including user-configured music rooms and analogous music-related digital assets having at least one of the songs and/or music videos copied to one or more blank music-related digital assets to produce a second generation of one or more music-related digital assets. In one implementation, the processor 220 sends permission to the user device 210 that the user is now free to sell, trade, or give away the second generation one or more music-related digital assets to other users within the virtual environment. In one implementation, the system further includes a user account database 240 including an account of the user to deduct a set amount from the account for the use of the songs and/or music videos included in the one or more music-related digital assets (such as user-configured music rooms and analogous music-related digital assets) owned by other users. In one implementation, the system further includes a user account database 240 including an account of the user to add a set amount to an account of the user for the use of the music-related digital content by other users, wherein the user holds the virtual content rights to the music-related digital content. In one implementation, the music-related digital content included in the one or more music-related digital assets including user-configured music rooms and analogous music-related digital assets further includes at least one of videos, audios, photos, and other media items to personalize the one or more music-related digital assets. In one implementation, the one or more music-related digital assets (such as user-configured music rooms and analogous music-related digital assets) includes at least one of artworks, logos, writings, and other items to personalize the one or more music-related digital assets.

In one implementation, the system 200 shown in FIG. 2 is a computer system that can support numerous user-configured music room creation, publication, sharing, and exchanging functions located throughout the virtual environment music world, with such functions accruing benefits to one or more of the platforms, the users, content owners and producers, third-parties, and the advertisers. In this regard, the following are contemplated: (1) the computer system to support the creation of music-related digital assets including user-configured music rooms and analogous music-related digital assets exchanges and Walkman-type devices and mobile devices for playback and social enablement; (2) the computer system to support the creation of music-related digital assets including user-configured music rooms and analogous music-related digital assets to be placed within the virtual environment world to be found by other users; (3) the computer system to support the creation of user-configured music room playback on a user's mobile phone or virtual mobile phone (mobile phone representation and user interface in a virtual environment); (4) the computer system to support the creation of virtual environment world created music-related digital assets including user-configured music rooms and analogous music-related digital assets that are placed within the real physical world as geo-located music-related digital assets to be found by others (user or non-users using a mobile companion application or analogous).

In one implementation, a system for managing access to music-related digital content in a virtual environment using virtual content rights is disclosed. The system includes: a virtual content rights database including data associating a user of the virtual environment with the virtual content rights acquired with respect to the music-related digital content; a processor to receive a request from a device of the user for assignment of the virtual content rights of the music-related digital content, wherein the user uses the device to interface with the processor, wherein the virtual content rights database is updated to indicate the assignment of the virtual content rights to the user, the processor to receive data from the device of the user holding the virtual content rights to music-related digital content including songs and/or music videos to create one or more music-related digital assets including user-configured music rooms and analogous music-related digital assets having at least one of the songs and/or music videos, wherein the virtual content rights database is updated to indicate sharing of the one or more music-related digital assets including user-configured music rooms and analogous music-related digital assets by the user within the virtual environment.

In one implementation, the processor receives a request to copy the virtual user-configured music room having the at least one of the songs to a blank virtual user-configured music room to produce a second-generation virtual user-configured music room. In one implementation, the processor sends permission to the user device that the user is now free to sell, trade, or give away the second-generation virtual user-configured music room to other users within the virtual environment. In one implementation, the system further includes a user account database including an account of the user to deduct a set amount from the account for the use of the songs included in the virtual user-configured music room owned by other users. In one implementation, the system further includes a user account database including an account of the user to add a set amount to an account of the user for the use of the digital content by other users, wherein the user holds the virtual content rights to the digital content. In one implementation, the digital content included in the virtual user-configured music room further includes at least one of videos, audios, photos, and other media items to personalize the virtual user-configured music room. In one implementation, virtual user-configured music room includes at least one of artworks, logos, writings, and other items to personalize the virtual user-configured music room.

In one implementation, the system 200 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 200 is configured with a combination of hardware and software.

Figure 3A:
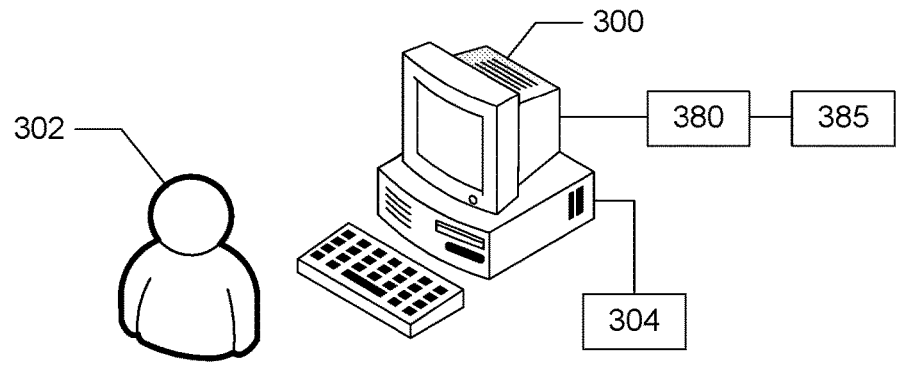
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement a music-related digital content access management application 390 as illustrated and described with respect to the method 100 and the system 200 in FIGS. 1 and 2.

Figure 3B:
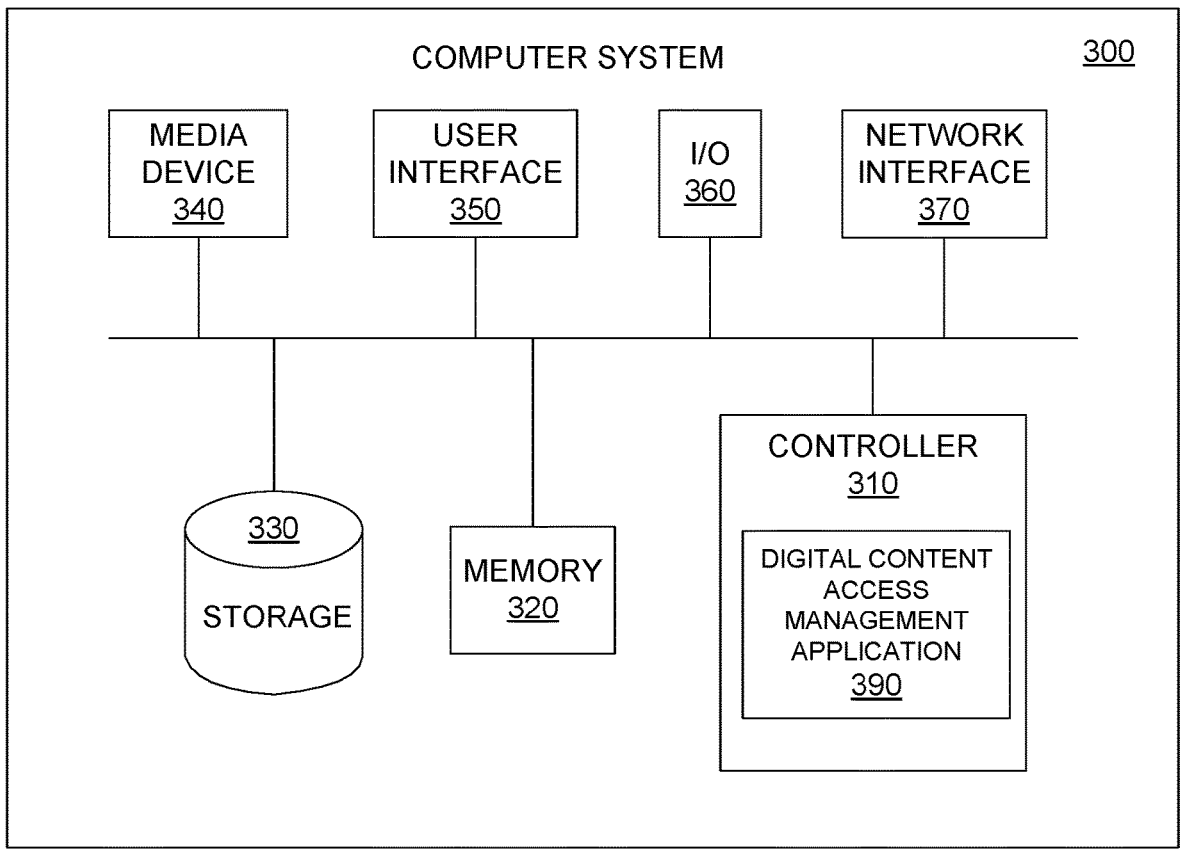
FIG. 3B is a functional block diagram illustrating the computer system hosting the music-related digital content access management application in accordance with an implementation of the present disclosure.

The computer system 300 stores and executes the music-related digital content access management application 390 of FIG. 3B. In addition, the computer system 300 may be in communication with a software program 304. Software program 304 may include the software code for the music-related digital content access management application 390. Software program 304 may be loaded on an external medium such as a CD, DVD, or a storage drive, as will be explained further below.

Furthermore, computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the music-related digital content access management application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the music-related digital content access management application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the music-related digital content access management application 390 with a software system, such as to enable the creation and configuration of engines and data extractors within the asset managing application 390. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the music-related digital content access management application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

In one implementation, a non-transitory computer-readable storage medium storing a computer program to manage access to music-related digital content in a virtual environment using virtual content rights is disclosed. The computer program includes executable instructions that cause a computer to: provide a virtual content rights database including data associating a user of the virtual environment with the virtual content rights acquired with respect to the music-related digital content; receive a request from a device of the user for assignment of the virtual content rights of the music-related digital content, wherein the user uses the device to interface with the processor; update the virtual content rights database to indicate the assignment of the virtual content rights to the user; receive data from the device of the user holding the virtual content rights to music-related digital content including songs and/or music videos to create one or more music-related digital assets including as user-configured music rooms and analogous music-related digital assets having at least one of the songs and/or music videos; and update the virtual content rights database to indicate sharing of the one or more music-related digital assets including user-configured music rooms and analogous music-related digital assets by the user within the virtual environment.

In one implementation, music rooms provide various content experiences. Depending on the configuration of the rooms, a collection of rooms can be arranged as a linear experience (one path in one direction, e.g., A to B to C, etc.) or as a non-linear experience (multiple paths and directions, e.g., A to B or C or D, B to A or D, etc.).

Various music room features and options are provided in different implementations. Examples of music room features include, but are not limited to:

(a) Rooms may be created in any shape;
(b) Rooms may have any combination of floors, walls, ceilings, doors, windows, stairs, pathways, and analogous structural features;
(c) Rooms may have any combination of furniture, pictures, rugs, wall colors, etc.;
(d) Room aspects may be represented in any light, color, and texture configuration;
(e) Rooms surfaces and spaces may present music related content in the form of art work, images, audio, photos, videos, text elements, objects, special effects, commercial and advertising elements, reward elements, and analogous; any of which may be interacted with by one or more users;
(f) Rooms can have multiple associated audio and video digital assets. The manner of presentation (position, timing, volume, quality, etc.) can be configured and customized;
(g) Any room structural, appearance, or content may be permanent, changing, or transitory in nature;
(h) Rooms may include branded and commercial elements that may be chosen and placed within such room(s) by the platform administrator, the platform user, or a combination of both; and
(i) Rooms and assets or objects associated with the room can have conditions that change the operation, presentation, or sequence of the asset. The conditions can be set by the user, platform identifier, or externally (e.g., an artist or content publisher).

Figure 4:
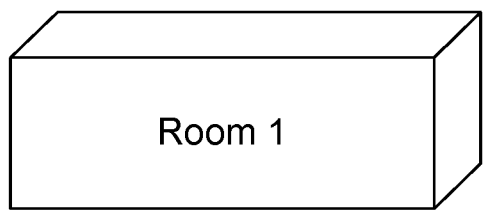
FIG. 4 shows a collection of music rooms, each as a separate content experience.
Figure 4:
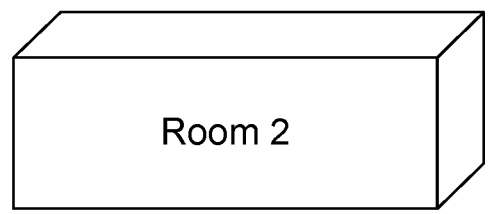
Figure 4:
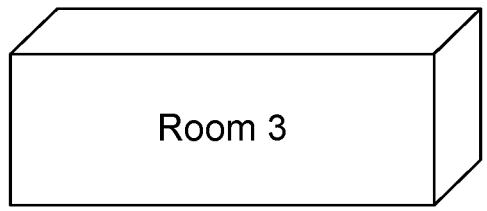
Figure 4:

For example, in FIG. 4, Room 1 may have a first shape and combination of furniture and decoration, and Rooms 2, 3, . . . , X may have different shapes and decoration. Similarly, the digital assets associated with each room can be different and configured independently.

In one implementation, music rooms are connected in various ways. Examples of music room connections and configurations include, but are not limited to:

(a) Each room may be created by platform administrator;
(b) Each room may be created by a platform user;
(c) Each room may be ordered/sequenced by the platform administrator;
(d) Each room may be ordered/sequenced by the platform user;
(e) Room provisioning (inserting a room into the user experience) and/or room ordering (how the provisioned rooms are presented to the user) may be deliberate by the user and/or platform administrator, or programmatically generated by the system;
(f) Some rooms may be created by the platform administrator and some by the platform user;
(g) All joined rooms may relate to single or multiple songs;
(h) All joined rooms may relate to single or multiple music genres or subject matters;

(i) All joined rooms may act as a three-dimensional music "mix tape" that may be played by a user walking through the rooms;
(j) All joined rooms may be shared by the platform administrator with a platform user based upon platform rules;
(k) All joined rooms may be shared by the platform user with other users based upon platform rules;
(l) Some room configurations are intended to be experienced by only one user; and
(m) Some room configurations are intended to be experienced by more than one user.

Figure 5:
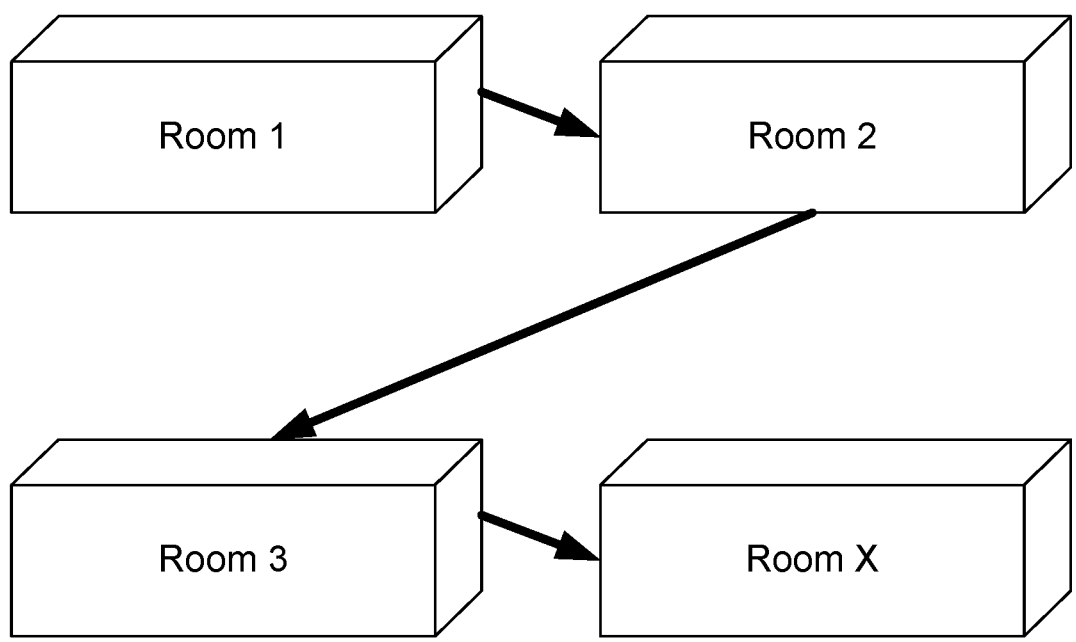
FIG. 5 shows a collection of music rooms, arranged in a linear experience.

FIG. 5 shows a representation of one implementation of a collection of music rooms configured as a linear experience. In FIG. 5, Room 1 is connected by a one-way path to Room 2. Room 2 is connected by a one-way path to Room 3. Room 3 is connected by a one-way path to the next room, Room X, and so on. Each room has at most one entrance and one exit (a starting room may or may not have an entrance, and an ending room may or may not have an exit). The connections or paths are also one-way and allow passage in one direction only (e.g., from Room 1 to Room 2, but not from Room 2 to Room 1). As a result, a user cannot return to a previously visited room (without starting the experience from the beginning again). The combination of paths creates a linear experience for a user. The user moves through the rooms in a set pattern, from Room 1 to Room 2 to Room 3 to Room X and so on to a final room. FIG. 5 shows four rooms in the representation, but any number of rooms can be linearly connected in the collection. In another implementation of a linear experience, the collection and paths have branches but the paths are all one-way. In this case, a room may have more than one exit. Because of the one-way paths, a user still cannot return to a previously visited room so the experience is linear. This configuration allows for multiple linear experiences of the same collection. In another implementation, a room can be included more than once in a linear connection, but each instance in the collection is separate for configuring exits. For example, Room 1 is connected to Room 2, Room 2 is connected to Room 3, Room 3 is connected to Room 1, and Room 1 is connected to Room X (1 to 2 to 3 to 1 to X). Room 1 is in the sequence twice, but the first time the exit leads to Room 2 and the second time the exit leads to Room X. This allows a user to re-use a room without creating a duplicate room. In another implementation, the experience in a room may change depending on when or how the user visits the room (e.g., the first time the user enters Room 1, Song A plays, and the second time the user enters Room 1, Song B plays). This allows the user to change the experience of a room with conditions.

Figure 6:
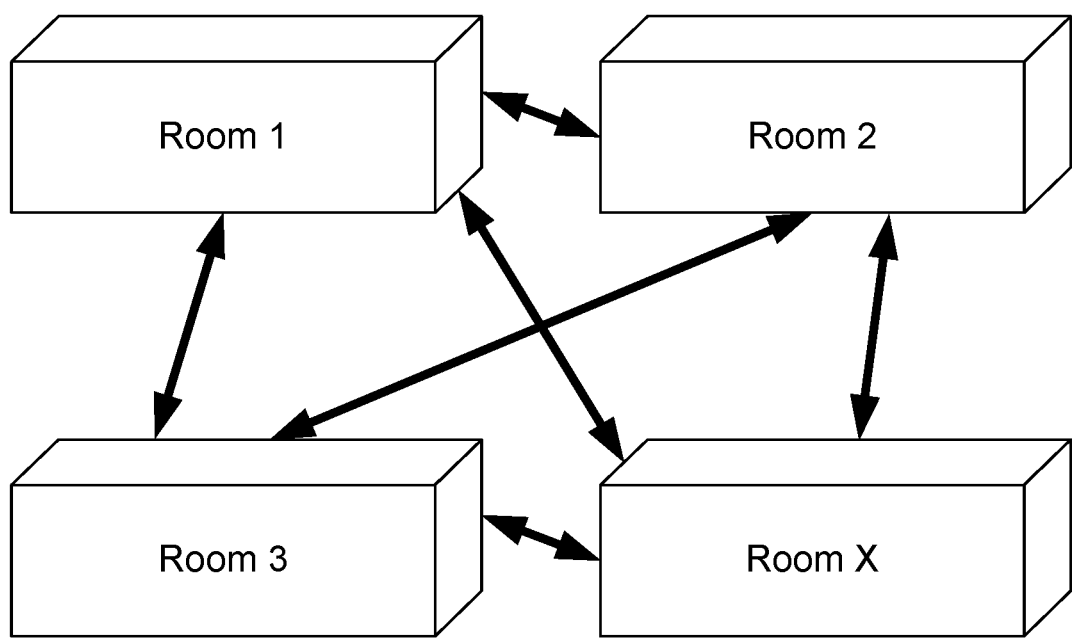
FIG. 6 shows a collection of music rooms, arranged in a non-linear experience.

FIG. 6 shows a representation of one implementation of a collection of music rooms configured as a non-linear experience. In FIG. 6, each of Rooms 1, 2, 3, . . . , X are shown to be interconnected by two-way paths. For example, Room 1 is connected by two-way paths to Room 2, Room 3, and Room X. The rooms have multiple entrances and exits. The paths are two-way and allow passage in either direction (e.g., from Room 1 to Room 2 and from Room 2 to Room 1). The combination of paths creates a non-linear experience for a user. The user moves through the rooms in any order and can return to a room previously visited. FIG. 6 shows four rooms in the representation, but any number of rooms can be interconnected in the collection. FIG. 6 shows all the rooms completely interconnected with two-way paths, but other implementations can use other combinations. In one example, Room 1 is connected to Rooms 2 and 3, but not to Room X. In another example, Room 1 is connected by a two-way path to Room 2 and one-way path to Room 3.

In another implementation, the linear and non-linear arrangement of assets can be applied to other types of assets, such as songs, music videos, audio clips, etc., and to combinations of types of assets. A representation of the assets and connections is similar to those in FIGS. 5 and 6, but the boxes may be other types of assets. For example, in one example of a linear experience of assets, the assets include Song 1, Song 2, Music Video, and Artist Image. Song 1 is connected to Song 2, Song 2 is connected to Music Video, and Music Video is connected to Artist Image. When experiencing this linear collection, the user will first hear Song 1, then hear Song 2, then see Music Video, and then see Artist Image. The transitions can be automated or by user action, or a combination. In another example, the collection can be associated with another collection or asset as a sub-collection or part of tiered structure.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, variations to the virtual environment include augmented reality (AR) environments, online environments (MMO, social networks, etc.), and mobile companions to virtual environments. Variations to the content include contents other than songs and/or music videos (e.g., video, images, digital object collections, and mixed types). Other variations include editing of objects in collections (e.g., changing, combining, original content) and uniqueness restrictions, scarcity. Thus, the present disclosure is not intended to be limited to the implementations shown herein but is to be accorded the widest scope consistent with the principal and novel features disclosed herein.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

Virtual Music-Themed World

The present disclosure relating to user-configured music rooms (and analogous music-related digital assets) generally pertains to the creation of a proprietary, affordable, robust, secure, adaptable, scalable, and entertaining music-themed world ("computer system") that may be accessed, consumed, manipulated, and shared on a variety of multi-media digital engagement platforms so that users may immersively experience all types of music through the use of any virtual environment device (e.g., a computer, game console, virtual reality headset, mobile phone, augment reality device) that can convey audio, visual, and haptic music experiences to one or more virtual environment world users. In the course of such virtual environment engagement, the users may interact with other users in a social manner, communicating with through text, chat, voice, visual, or analogous mediums. The users may also engage with others who are not concurrently present within the virtual environment world by leaving them messages in various forms, or by sending messages to others outside the virtual environment world completely (e.g., text message from within the virtual environment world to a text recipient outside the virtual environment world on a physical world phone). Further, the immersive nature of the virtual environment world will enable non-music types of interactions that are complementary to music engagement, including, but not limited to brand engagements, consumer purchase engagements for digital and/or physical merchandise (standard issue, user-generated, customizable, or otherwise), video games, scavenger hunts, rides, games of chance, games of skill, virtual concerts, story-telling experiences, virtual movies, virtual TV shows, virtual sport events, virtual esports events, ownership, customization, and use of virtual property, educational experiences, meditation, health, and mindfulness experiences, and analogous. To better support these types of diverse activities, the virtual environment world will employ a virtual and non-virtual currency system to promote economic interactions between the users and each other, the platform operators themselves, as well as non-user participants in the platform. Similarly, the system will support users in their various engagements by having various forms of informational prompts throughout, where users may be intelligently guided on the features of the system as they pertain to those users tastes and needs specifically (personalized guidance), and in some cases the informational prompts may take the form of artificial intelligence avatars (non-person characters) that present themselves to users a in world characters to be interacted with.

Significant Aspects of the Present Disclosure

The computer system supporting this system can be centralized on a single computer, on an array of computers, be centrally housed, be distributed, and/or any combination thereof. The computer system can be used to provide instructions to music creators (human, artificial intelligence, or any combination thereof) on modifications to be made to the new and distinct piece of music under review by the present disclosure.

The computer system can be used to provide instructions to music creators (human, artificial intelligence, or any combination thereof) on the creation of new music.

The computer system can combine the analysis and results of multiple instances of pre-existing and new and distinct pieces of music and fundamental music segments extractions.

The computer system can be used to identify and advise on the types of musical attributes to be avoided in a given new and distinct piece of music under review by the present disclosure.

The computer system can be used to determine and/or confirm the possible ranges of new music popularity, the level of commercial appeal of new music, the level of synergy between the subject music and paired products, services, and advertisements, the price point or points at which the new music may be sold to different types of music listeners, and the therapeutic benefits likely to accrue to those listening to such new music.

The computer system can source a new and distinct piece of music for analysis through direct submission by the operator of the computer system.

The computer system can source a new and distinct piece of music for analysis by automatically crawling publicly available music pieces that are resident on third party systems (e.g., private databases or public Internet).

The computer system can support virtual concerts that enable artists to create a "volumetric" and/or "holographic" version of themselves and merge it with a virtual concert venue that they design from their imagination.

The computer system can support music listening rooms as a feature that customizes a virtual building and showcases songs and/or music videos, lyrics, videos, photography, and factoids in an immersive interactive experience.

The computer system can support artist ride experiences that take users on an immersive journey featuring one or more songs and/or music videos and simulating a traditional theme park ride.

Comprehensive personalization allowing users to customize their own music room, create virtual music-related digital assets (such as user-configured music rooms and analogous music-related digital assets), and apply virtual clothing, hair styles, hats, etc. onto their avatar.

The computer system can support virtual music avatars/personalities engaging with users via artificial intelligence and delivering personalized narratives, quests, and other voice powered interactions.

The computer system can support storytelling & immersive podcasts that tell an interactive story using a specific playlist of songs and/or music videos, visuals, and voiceover narration.

The computer system can support customer collection, engagement, retention, and reward mechanisms that are effective in a physical amusement park setting as imported into a virtual environment world setting.

The computer system can support design of the system to enable porting to various head mount display ("HMD") systems, whether PC-tethered HMDs, game console-tethered HMDs, all-in-one mobile HMDs (e.g., Wi-Fi or cellular wireless connectivity HMDs), mobile phone "slide in" HMDs, or otherwise.

The computer system can support the creation of community events at scheduled times throughout the day (e.g., every hour the EDM city goes into a light show like the way Hong Kong does every night).

Advertising Related Aspects of the Present Disclosure

The computer system can support numerous functions related to the engagement of users and advertisers, with such engagements accruing benefits to one or more of the platforms, the users, third-parties, and the advertisers. In this regard, the following are contemplated:

The computer system to support virtual billboards where users may engage with ad and get reward (virtual currency, content, or music-related digital assets). The rewards to range from free or discount coupons; and may be for in-world or outside-world assets.

The computer system to support virtual brand sponsored areas where users may engage with any activity within a brand sponsored area and get reward (virtual currency, content, or music-related digital assets). The rewards to range from free or discount coupons; and may be for in-world or outside-world assets.

The computer system to support virtual concerts where users engage with brand sponsored concerts and get reward (virtual currency, content, or music-related digital assets). The rewards to range from free or discount coupons; and may be for in-world or outside-world assets.

The computer system to support virtual mini-games where users engage with brand sponsored game and get reward (virtual currency, content, or music-related digital assets). The rewards to range from free or discount coupons; and may be for in-world or outside-world assets.

The computer system to support virtual mini-rides where users engage with brand sponsored game and get reward (virtual currency, content, or music-related digital assets).

The rewards to range from free or discount coupons; and may be for in-world or outside-world assets.

The computer system to support virtual non-billboard artifacts where users engage with ad and get reward (virtual currency, content, or music-related digital assets). In this case, artifacts are to be stationary or moving (self-animated or moveable by user). The rewards to range from free or discount coupons; and may be for in-world or outside-world assets.

The computer system to support virtual product placement artifacts where users engage with product and get reward (virtual currency, content, or music-related digital assets). In this case, artifacts are to be stationary or moving (self-animated or moveable by user). The rewards to range from free or discount coupons; and may be for in-world or outside-world assets.

The computer system to support virtual product placement functional features (e.g., transportation) where end-users engage with product (e.g., Lyft, Uber) and get reward (virtual currency, content, or music-related digital assets). The rewards to range from free or discount coupons; and may be for in-world or outside-world assets.

Blockchain Related Aspects of the Present Disclosure

The computer system can support numerous functions related to the use of blockchain technologies, with such functions accruing benefits to one or more of the platforms, the users, content owners and producers, third-parties, and the advertisers. In this regard, the following are contemplated:

The computer system to support the creation of virtual digital music-related merchandise scarcity, including mechanisms for the recordation and trading of such music-related digital assets.

The computer system to support the creation of one or more music-related digital assets (such as user-configured music rooms and analogous music-related digital assets) scarcity, including mechanisms for fostering "breed-able" digital DNA music-related digital assets (such as user-configured music rooms and analogous music-related digital assets)/collaborative with artists who produce music-related digital assets (such as user-configured music rooms and analogous music-related digital assets) that are designated by generation (e.g., the first generation of a user-configured music room so produced would be a "Gen0" user-configured music room).

The computer system to support the creation of virtual music-related digital "real estate" scarcity, including mechanisms for implementing blockchain scarcity, recordation, privacy, access controls, personalization spaces for user rooms or other real estate bought, sold, earned, or gifted. Further, the blockchain mechanisms to support economic activities associated with music-related digital real estate tied to artist brands (e.g., split revs with Artist when you buy and build house in "Artist Land").

Browser Related Aspects of the Present Disclosure

The computer system can support numerous functions related to the use of virtual web browsers located throughout the virtual environment music world, with such functions accruing benefits to one or more of the platforms, the users, content owners and producers, third-parties, and the advertisers. In this regard, the following are contemplated:

The computer system to support the creation of in-world virtualized browsers for user consumption of music entertainment content.

The computer system to support the creation of in-world virtualized browsers for user consumption of film and TV entertainment content.

The computer system to support the creation of in-world virtualized browsers for user consumption of news entertainment content.

The computer system to support the creation of in-world virtualized browsers for user consumption of shopping entertainment content.

The computer system to support the creation of in-world virtualized browsers for user consumption of sports entertainment content.

The computer system to support the creation of in-world virtualized browsers for user consumption of educational entertainment content.

The computer system to support the creation of in-world virtualized browsers for user consumption of analogous entertainment and non-entertainment content.

Commerce Related Aspects of the Present Disclosure

The computer system can support numerous commercial activity functions located throughout the virtual environment music world, with such functions accruing benefits to one or more of the platforms, the users, content owners and producers, third-parties, and the advertisers. In this regard, the following are contemplated:

The computer system to support the discovery, interaction, ordering, and/or fulfillment of commercial consumption of digital entertainment and digital non-entertainment goods and services.

The computer system to support the discovery, interaction, ordering, and/or fulfillment of commercial consumption of physical entertainment and physical non-entertainment goods and services.

Communications Related Aspects of the Present Disclosure

The computer system can support numerous functions related to the use of communication technologies, with such functions accruing benefits to one or more of the platforms, the users, content owners and producers, third-parties, and the advertisers. In this regard, the following are contemplated:

The computer system to support the creation of a virtual communication channel that allows messaging of various types (e.g., voice, text, chat, video, photos, emojis) to be originated by a party (e.g., platform operator, user, content owner and producer, third-party, advertiser) within the virtual environment world and be received by one or more parties inside of the virtual environment world (e.g., on-to-one communications, one-to-several communications, one-to-all communications).

The computer system to support the creation of a virtual communication channel that allows messaging of various types (e.g., voice, text, chat, video, photos, emojis) to be originated by a party (e.g., platform operator, user, content owner and producer, third-party, advertiser) within the virtual environment world and be received by one or more parties outside of the virtual environment world (e.g., on-to-one communications, one-to-several communications, one-to-all communications). In this case, the message receipt externally may be a third-party messaging application or a messaging application associated with the platform itself (e.g., a "companion app").

In the case of internal and external messaging, one purpose may be to keep parties informed of virtual environment world happenings (new songs and/or music videos, games, rewards, concerts, etc.) when they are inside or outside of the virtual environment world (inside-out/outside-in functions).

Virtual Concert Related Aspects of the Present Disclosure

The computer system can support numerous functions relating to the delivery of live and/or recorded virtual concerts within the virtual environment world system, with such functions accruing benefits to one or more of the platforms, the users, content owners and producers, third-parties, and the advertisers. In this regard, the following are contemplated:

The computer system to support the creation of branded, real-world physical venues for concerts that are either recreated within the virtual environment world as CGI assets, volumetrically scanned, or rendered as a combination thereof.

The computer system to support the creation of branded, previously (i.e., no longer in existence) real-world physical venues for concerts that are either recreated within the virtual environment world as CGI assets, volumetrically scanned, or rendered as a combination thereof.

The computer system to support the creation of branded, non-real-world (fictional) venues for concerts that are either recreated within the virtual environment world as CGI assets, volumetrically scanned, or rendered as a combination thereof.

The computer system to support the creation of fictional or non-fictional virtualized venues for concerts that include a concert experience represented by virtual special effects such as fireworks, light shows, flying objects, and analogous that are generated by the platform administrator of the virtualized venue, a user of the virtualized venue, the users collectively of the virtualized venue, a brand sponsor of the virtualized venue, or a combination thereof.

The computer system to support the creation of fictional or non-fictional virtualized venues for concerts that include a concert experience represented by virtual user expressions such as configurable user dance moves, emotes, object displays (e.g., lighters, glow sticks), and analogous that are generated by the platform administrator of the virtualized venue, a user of the virtualized venue, the users collectively of the virtualized venue, a brand sponsor of the virtualized venue, or a combination thereof.

The computer system to support the creation of fictional or non-fictional virtualized venues for concerts that include a concert experience represented by user avatar participation in the virtual concert such as capturing of user avatar selfies, in-venue virtual flying drone image captures of users, feed of user avatar activities to one or more video screens within the venue (e.g., via fixed position or flying drone crowd cams, and analogous that are generated by the platform administrator of the virtualized venue, a user of the virtualized venue, the users collectively of the virtualized venue, a brand sponsor of the virtualized venue, or a combination thereof.

Digital Merchandise and Services Related Aspects of the Present Disclosure

The computer system can support numerous digital merchandise and services activity functions located throughout the virtual environment music world, with such functions accruing benefits to one or more of the platforms, the users, content owners and producers, third-parties, and the advertisers. In this regard, the following are contemplated:

The computer system to support the discovery, interaction, ordering, and/or fulfillment of commercial consumption of user avatars.

The computer system to support the discovery, interaction, ordering, and/or fulfillment of commercial consumption of music-related digital virtual real estate.

The computer system to support the discovery, interaction, ordering, and/or fulfillment of commercial consumption of user personal space and avatar customization assets.

The computer system to support the discovery, interaction, ordering, and/or fulfillment of commercial consumption of user-controlled music rights where users can accrue prizes, points, tickets, credits, and other items of value when other users in the world engage with a song or music asset that is bound to the account of the music rights owner in the world.

The computer system to support the discovery, interaction, ordering, and/or fulfillment of commercial consumption activities that are recorded and maintained on a blockchain.

The computer system to support the discovery, interaction, ordering, and/or fulfillment of commercial consumption activities that are originated within the virtual music world and delivered physically in the real world (e.g., seeing a digital representation of an object ion the virtual world and ordering its physical analog for delivery to the user in the physical world).

Experience Discovery Related Aspects of the Present Disclosure

The computer system can support numerous virtual environment experience discovery activity functions located throughout the virtual environment music world, with such functions accruing benefits to one or more of the platforms, the users, content owners and producers, third-parties, and the advertisers. In this regard, the following are contemplated:

The computer system to support the creation of a virtual environment music world directory guide, akin to a shopping mall kiosk that you can walk up to and see what else is in the world.

The computer system to support the creation of a "find your favorite artist" feature where a user can stare at a particular non-person character avatar (e.g., the musician Slash) and he will start interacting and talking to you (similar to having Mickey Mouse engage with a visitor at Disneyland). Similarly, a user might engage long enough or in a certain way (e.g., answer trivia) and receive rewards, merchandise, prizes, credits, etc. (rewards to be for in-world or outside-world assets or services). Conversely, if a user engages inappropriately the user will be punished (e.g., take a selfie with him without asking for permission and the user you might have their virtual phone camera smashed by the avatar on the ground).

The computer system to support the creation of a real-world map where a user can place a pin in the real city a user lives so people can see where people are visiting from (social feature).

The computer system to support the discovery of AI based music playlists, artificial intelligence driven virtual DJs, etc.

The computer system to support the creation of a searchable database that markets and sells platform music-related digital assets (e.g., concert tickets, music-related digital assets (such as user-configured music rooms and analogous music-related digital assets), gold records, music-related digital virtual real estate titles, virtual coins, tokens, digital merchandise) and can be seen by other users and enables buying, selling, trading of the same.

Environmental Effects Related Aspects of the Present Disclosure

The computer system can support numerous virtual environment effect functions located throughout the virtual environment music world, with such functions accruing benefits to one or more of the platforms, the users, content owners and producers, third-parties, and the advertisers. In this regard, the following are contemplated:

The computer system to support the creation of an ever changing and reskinning world assets (sky, buildings, rooms, fireworks, meteors, etc.). In this regard, the effects can be determined by the platform administrator of the virtual world, by an individual user (singular) taste, by a collective of users (collective) tastes, by brands, by artists, or by some combination thereof. In addition, the effects may be set to music or not.

Game Related Aspects of the Present Disclosure

The computer system can support numerous virtual environment gaming functions located throughout the virtual environment music world, with such functions accruing benefits to one or more of the platforms, the users, content owners and producers, third-parties, and the advertisers. In this regard, the following are contemplated:

The computer system to support the creation of artist centric or genre/sub-genre centric scavenger hunts games with rewards, where items found are influenced by various aspects (location, skill, chance).

The computer system to support the creation of artist centric or genre/sub-genre centric dance games with rewards.

The computer system to support the creation of role-playing games where highest scoring players have status in music industry world, such as Mayor, Tenant, Tourist, etc.

The computer system to support the creation of user-configured music room competitions (e.g., which music-related digital assets (such as user-configured music rooms and analogous music-related digital assets) are copied the most, played the most, etc.).

The computer system to support the creation of a new music "fight club" room or "March Madness" room for new songs and/or music videos stream counts from Billboard determine winners and losers (winner gets a prize).

The computer system to support the creation of virtual passport that gets virtually stamped as you go into different cities/neighborhoods/rooms and that passport can be seen by other users, as well as result in additional benefits or status accruing to the user as the number of stamps in their passport increases.

The computer system to support the creation of tracking and awarding users with the greatest number of re-mixed tapes created.

The computer system to support the creation of simple arcade games like Flappy Bird (type), Corn Hole, Carnival Ball Throw, Shooting Range, Bowling Alley. As an extension, the present disclosure also contemplates having objects thrown or shot are artists, records, guitars, speakers, disco balls, etc.

The computer system to support the creation of wagering type games (traditional or unique).

The computer system to support the creation of Song Guardian type game for both "Masters" and "Limited Editions", where the virtual environment owner of that song gets virtual environment world royalties each time the song is played by others in the world.

The computer system to support the creation of music-themed sweepstakes with prizes.

Music Rooms as Three-Dimensional Analogs to Traditional Mix Tapes

The computer system can support numerous user-configured music room creations, publications, sharing, and exchanging functions located throughout the virtual environment music world, with such functions accruing benefits to one or more of the platforms, the users, content owners and producers, third-parties, and the advertisers. In this regard, the following are contemplated:

The computer system to support the creation of music-related digital assets (such as user-configured music rooms and analogous music-related digital assets) exchanges and music room playback devices and social enablement functions.

The computer system to support the creation of music-related digital assets (such as user-configured music rooms and analogous music-related digital assets) to be placed within the virtual environment world to be found by other users.

The computer system to support the creation of user-configured music room playback by a user visitor to the music rooms in question.

The computer system to support the creation of virtual environment world created music-related digital assets (such as user-configured music rooms and analogous music-related digital assets) that are placed within the real physical world as geolocated music-related digital assets to be found by others (user or non-users using a mobile companion application or analogous).

Rewards Related Aspects of the Present Disclosure

The computer system can support numerous reward functions located throughout the music rooms, with such functions accruing benefits to one or more of the platforms, the users, content owners and producers, third-parties, and the advertisers. In this regard, the following are contemplated.

The computer system to support users engaging with concert performances and get rewarded (virtual currency, content, music-related digital assets, etc.) while interacting with or within the music rooms. In the case of rewards, they may be for in-world or outside-world assets, and can range from free items to discount coupons.

The computer system to support users engaging with designated functional feature (e.g., a new search feature, or new mix feature) and get reward (virtual currency, content, music-related digital assets, etc.) while interacting with or within the music rooms. In the case of rewards, they may be for in-world or outside-world assets, and can range from free items to discount coupons.

The computer system to support users engaging with games (scavenger hunt, games, wandering musician or guru who hands out rewards) and get reward (virtual currency, content, music-related digital assets, etc.) while interacting with or within the music rooms. In the case of rewards, they may be for in-world or outside-world assets, and can range from free items to discount coupons.

Non The computer system to support users engaging with rides and get reward (virtual currency, content, music-related digital assets, etc.) while interacting with or within the music rooms. In the case of rewards, they may be for in-world or outside-world assets, and can range from free items to discount coupons.

The computer system to support users engaging with any other activity within a designated virtual environment world area and get reward (virtual currency, content, music-related digital assets, etc.) while interacting with or within the music rooms. In the case of rewards, they may be for in-world or outside-world assets, and can range from free items to discount coupons.

Virtual Music-Related Real Estate Related Aspects of the Present Disclosure

The computer system can support numerous virtual music-related real estate functions located within the music rooms, with such functions accruing benefits to one or more of the platforms, the users, content owners and producers, third-parties, and the advertisers. In this regard, the following are contemplated:

The computer system to support users engaging with virtual music-related real estate that is artist created, managed, or owned.

The computer system to support users that create their own "settlement" (e.g., a house with my music collection) where other users can visit and leave them messages (perhaps connecting your Instagram or FB works here too).

The computer system to support users engaging with virtual music-related real estate that is virtual environment music world operator created, managed, or owned.

Ride Related Aspects of the Present Disclosure

The computer system can support numerous ride functions located within the music rooms, with such functions accruing benefits to one or more of the platforms, the users, content owners and producers, third-parties, and the advertisers. In this regard, the following are contemplated:

The computer system to support users engaging "down the rabbit hole" music room ride experiences where the user experience starts with one song and meta data and it branches to five other songs and/or music videos (linked), that are further linked to another five, etc.

The computer system to support users engaging active ride experiences where user choices at various stages of the music room ride result in a changing narrative to the ride and the rewards earned (if any).

The computer system to support users engaging passive music room ride experiences where there are no user choices at various stages of the ride.

The computer system to support having music room rides "leave" every few minutes where multiple users can go on a particular virtual environment ride experience together (just like ride schedules at Disneyland).

The computer system to support users engaging in non-music thematic room rides associated with film, TV artists, or other genres.

The computer system to support users engaging in rides where users are guided through the ride experience by celebrities, taxi drivers, or other analogous type of person or non-person entity.

Room Related Aspects of the Present Disclosure

The computer system can support numerous music and non-music room functions located throughout the virtual environment music world, with such functions accruing benefits to one or more of the platforms, the users, content owners and producers, third-parties, and the advertisers. In this regard, the following are contemplated:

The computer system to support users engaging with rooms providing thematic content associated with social responsibility (e.g., Habitat for Humanity, Rock the Vote).

The computer system to support users engaging with rooms providing thematic content associated with museums.

The computer system to support users engaging with rooms providing thematic content such as museum type digital assets.

The computer system to support users engaging with rooms providing thematic content associated with music documentaries (all music); including but not limited to talk show style rooms with curators discussing music content (live & recorded) as well as rooms with narration/story telling (e.g., actor voiceover takes you through an artist's history).

The computer system to support users engaging with rooms providing thematic content associated with record stores.

The computer system to support users engaging with rooms providing thematic content associated with music artists.

The computer system to support users engaging with rooms providing thematic content associated with music genres.

The computer system to support users engaging with rooms providing thematic content associated with music labels.

The computer system to support users engaging with rooms providing thematic content associated with DJs who do shows.

The computer system to support users engaging with rooms providing thematic content associated with music sponsors.

The computer system to support users engaging with rooms providing thematic content associated with music discovery (all music), whether discovered through traditional music channels or alternative social or web channels (e.g., Twitter, Wikipedia, YouTube, latest news).

The computer system to support users engaging with rooms providing thematic content associated with digital social activities.

The computer system to support users engaging with rooms providing thematic content associated with Sony branded entertainment (e.g., comedy/film/TV).

The computer system to support users engaging with rooms providing thematic content associated with non-Sony branded entertainment (e.g., comedy/film/TV).

The computer system to support users engaging with rooms providing thematic content associated with secret rooms (e.g., changing password at the door/solve a riddle/mention a favorite brand to gain access).

The computer system to support users engaging with rooms providing thematic content associated with stem rooms (e.g., listen to songs and/or music videos where you can toggle stems on/off).

The computer system to support users engaging with rooms providing thematic content associated with a talk show with curators discussing non-music content (film, TV, news, sports, fashion, food); and it is contemplated that the experiences might be either live and/or recorded.

The computer system to support users engaging with rooms providing thematic content associated with tilt brush types of user generated content.

The computer system to support users engaging with rooms providing thematic content associated with time capsule rooms/time travel rooms (e.g., user picks a year from the outside, and then on the inside the room transforms to that year in style and the playlist are only songs and/or music videos from that year).

The computer system to support users engaging with rooms providing thematic content associated with karaoke bars with scheduled events (e.g., 8 PM is 80s night).

The computer system to support users engaging with rooms providing thematic content associated with music education; including but not limited to classrooms for how to play guitar, piano, music theory, history of music, etc. and where such lessons might also be sponsored by generic brand or music instrument brand.

The computer system to support users engaging with rooms providing thematic content associated with music film scores. In this regard, the present disclosure may contemplate experiences based on partial music and partial film content, as well as talk show style rooms with curators discussing music content, and in each case possibly live and/or recorded.

The computer system to support users engaging with rooms providing thematic content associated with music influencers (all music), where such experiences may focus on influences and inspirations from artists about artists and other motivational events. Other aspects may involve a focus on influencers and exploring what draws them to certain types of music.

The computer system to support users engaging with rooms providing thematic content associated with music performance and Billboard type popularity rankings (all music), including data related to new entrants, leaders, laggards, etc.

The computer system to support users engaging with rooms providing thematic content associated with music podcasts (all music), focusing on all stakeholders whether they be artists, critics, fans, or otherwise.

The computer system to support users engaging with rooms providing thematic content associated with music talk show (all music). This would also extend to talk show style rooms with curators discussing music content, and could be live and/or recorded.

The computer system to support users engaging with rooms providing thematic content associated with a music talk show (a mixture of music and music commentary). An example being music discovery and talk show style rooms with curators playing and discussing music content (e.g., Gimme Radio), and may be live and/or recorded.

The computer system to support users engaging with rooms providing thematic content associated with trivia rooms. In this regard, the present disclosure envisions having music trivia nights (e.g., each night at 7 PM is a trivia competition with prizes). Possibly expand beyond music in later versions.

The computer system to support users engaging with rooms providing thematic content associated with invitation only rooms (e.g., exclusivity for personal rooms or VIPs such as contest winners). Users can monetize their coolness by selling access to their spaces.

The computer system to support users engaging with rooms providing thematic content associated with mobile cellular carriers.

The computer system to support users engaging with rooms providing thematic content associated with bars, sports bars, and restaurants.

The computer system to support users engaging with rooms providing thematic content associated with gaming and gambling (and prizes).

The computer system to support users engaging with rooms providing thematic content associated with simple games (and prizes). In this regard, rooms like Flappy Bird (type), Corn Hole, Carnival Ball Throw, Shooting Range, Bowling Alley. As an extension, the present disclosure also contemplates having objects thrown or shot are artists, records, guitars, speakers, disco balls, etc.

The computer system to support users engaging with rooms providing thematic content associated with pool halls.

The computer system to support users engaging with rooms providing thematic content associated with tattoo parlors.

The computer system to support users engaging with rooms providing thematic content associated with video game viewership.

The computer system to support users engaging with rooms providing thematic content associated with health and wellness.

The computer system to support users engaging with rooms providing thematic content associated with meditation and mindfulness.

The computer system to support users engaging with rooms providing thematic content associated with subjects of personal inspiration.

Social Related Aspects of the Present Disclosure

The computer system can support numerous social functions located within the music rooms, with such functions accruing benefits to one or more of the platforms, the users, content owners and producers, third-parties, and the advertisers. In this regard, the following are contemplated:

The computer system to support users utilizing social mechanics of users buying ads within the virtual environment world to promote their own rooms and user generate content.

The computer system to support users connect social networks like Instagram to their personal real estate spaces and auto populate these rooms with photos, etc. (e.g., have a picture frame on a wall auto load you Instagram photo).

The computer system to support users utilizing social mechanics for peer-to-peer gifting of digital and physical merchandise, services, or currency.

The computer system to support users utilizing social mechanics to ascertain the identity of another user or their space by making an inquiry (e.g., pressing button X).

The computer system to support users utilizing social mechanics to easily import third-party social media data (constantly evolving/refreshed Twitter, Facebook, Instagram, etc. feeds).

The computer system to support users utilizing social mechanics for peer-to-peer user-configured music room sharing.

The computer system to support users utilizing social mechanics for undertaking social media searches.

The computer system to support users utilizing social mechanics of utilizing traditional social APIs (Twitter/Instagram/Pinterest/FB) to communicate to others within and external to the virtual environment world.

User-Generated Content (UGC) Related Aspects of the Present Disclosure

The computer system can support UGC aspects located within the music rooms, with such functions accruing benefits to one or more of the platforms, the users, content owners and producers, third-parties, and the advertisers. In this regard, the following are contemplated:

The computer system to support users creating graffiti artwork located within the music rooms. Places a user's "<username> was here" message on a virtual environment world wall—like people would write their name on the wall of a bathroom. Ability to see other users who visited a room.

The computer system to support users submitting new music to be uploaded and voted on by other users.

The computer system to support users creating their own music via artificial intelligence tools (e.g., such as Amper).

Video Rooms Related Aspects of the Present Disclosure

The computer system can support video room aspects within the music rooms, with such functions accruing benefits to one or more of the platforms, the users, content owners and producers, third-parties, and the advertisers. In this regard, the following are contemplated:

The computer system to support the use of a video room that can be thematically designed to show concerts.

The computer system to support the use of a video room that can be thematically designed to show documentaries.

The computer system to support the use of a video room that can be thematically designed to show educational materials.

The computer system to support the use of a video room that can be thematically designed to show photo streams.

The computer system to support the use of a video room that can be thematically designed to show movies.

The computer system to support the use of a video room that can be thematically designed to show TV shows.

The computer system to support the use of a video room that can be thematically designed to show music story experiences.

The computer system to support the use of a video room that can be thematically designed to show sports and esports content.

Miscellaneous Aspects of the Present Disclosure

The computer system can support numerous miscellaneous functions within the music rooms, with such functions accruing benefits to one or more of the platforms, the users, content owners and producers, third-parties, and the advertisers. In this regard, the following are contemplated:

The computer system to support the creation of numerous obvious and secret worm holes or analogous teleportation elements to move throughout the virtual environment world.

The computer system to support the creation of various room popularity rankings, including but not limited to the creation of ranking lists of rooms (what are most popular cities, neighborhoods, rooms, etc.).

The computer system to support the creation of a hi-resolution audio features such as hi resolution and/or immersive audio rooms. Further, in these scenarios there will be the option of creating an audio hardware branding opportunity.

The computer system to support the creation of a spatial audio customization with an ability for platform, artist, user, or other participant to program the audio sound qualities of a particular virtual environment space they control or are experiencing. In this regard, there will also be aspects of control to be derived from one or more of distances of space, ceiling, floor, and walls to a user, interior material types, interior openings, objects and people populating the space.

Additional variations and implementations are also possible. For example, the creation and management of assets other than music-related assets. For example, in one implementation, the assets are related to an education topic for a teaching experience. In another implementation, the assets are medical records and information to explain a case study, or present a patient experience, procedure, or history.

The invention claimed is:

1. A method for managing access to digital content in a virtual environment using virtual content rights, the method comprising:
   providing a virtual content rights database comprising data associating a user of the virtual environment with the virtual content rights acquired with respect to the digital content;
   receiving, at a processor, a request from a device of the user for assignment of the virtual content rights of the digital content, wherein the user uses the device to interface with the processor;
   updating the virtual content rights database to indicate the assignment of the virtual content rights to the user;
   receiving, at the processor, data from the device of the user holding the virtual content rights to digital content including songs to create a virtual user-configured music room having at least one of the songs; and
   updating the virtual content rights database to indicate sharing of the virtual user-configured music room by the user within the virtual environment.

2. The method of claim 1, wherein sharing of the virtual user-configured music room comprises at least one of transferring, lending, renting, selling, copying, and combining the virtual user-configured music room.

3. The method of claim 1, wherein sharing of the virtual user-configured music room comprises at least one of displaying and playing for others in the virtual environment.

4. The method of claim 1, further comprising
   receiving, at the processor, a request to buy a blank virtual user-configured music room.

5. The method of claim 4, further comprising
   receiving, at the processor, a request to copy the virtual user-configured music room having the at least one of the songs to the blank virtual user-configured music room to produce a second-generation virtual user-configured music room.

6. The method of claim 5, further comprising
   sending permission to the user device that the user is now free to sell, trade, or give away the second-generation virtual user-configured music room to other users within the virtual environment.

7. The method of claim 1, wherein the virtual content rights for the digital contents are held by other users and the songs included in the virtual user-configured music room are owned by the other users.

8. The method of claim 7, further comprising
   deducting a set amount from an account of the user in a user account database for the use of the songs included in the virtual user-configured music room owned by the other users.

9. The method of claim 1, wherein the digital content included in the virtual user-configured music room further includes
   at least one of videos, audios, photos, and other media items to personalize the sharing of the virtual user-configured music room.

10. The method of claim 1, wherein the virtual user-configured music room includes at least one of artworks, logos, writings, and other items to personalize the sharing of the virtual user-configured music room.

11. The method of claim 1, further comprising
    adding a set amount to an account of the user in a user account database for the use of the digital content by other users, wherein the user holds the virtual content rights to the digital content.

12. The method of claim 1, further comprising
    receiving, at the processor, a request from a device of the user to add songs of other users to the virtual user-configured music room of the user by trading access to the songs owned by the user, wherein the other users hold the virtual content rights to the songs to be added.

13. A system for managing access to digital content in a virtual environment using virtual content rights, the system comprising:
    a virtual content rights database comprising data associating a user of the virtual environment with the virtual content rights acquired with respect to the digital content;
    a processor to receive a request from a device of the user for assignment of the virtual content rights of the digital content, wherein the user uses the device to interface with the processor, wherein the virtual content rights database is updated to indicate the assignment of the virtual content rights to the user,
    the processor to receive data from the device of the user holding the virtual content rights to digital content including songs to create a virtual user-configured music room having at least one of the songs,
    wherein the virtual content rights database is updated to indicate sharing of the virtual user-configured music room by the user within the virtual environment.

14. The system of claim 13, wherein the processor receives a request to copy the virtual user-configured music room having the at least one of the songs to a blank virtual user-configured music room to produce a second-generation virtual user-configured music room.

15. The system of claim 14, wherein the processor sends permission to the user device that the user is now free to sell, trade, or give away the second-generation virtual user-configured music room to other users within the virtual environment.

16. The system of claim 13, further comprising
a user account database including an account of the user to deduct a set amount from the account for the use of the songs included in the virtual user-configured music room owned by other users.

17. The system of claim 13, further comprising
a user account database including an account of the user to add a set amount to an account of the user for the use of the digital content by other users, wherein the user holds the virtual content rights to the digital content.

18. The system of claim 13, wherein the digital content included in the virtual user-configured music room further includes
at least one of videos, audios, photos, and other media items to personalize the virtual user-configured music room.

19. The system of claim 13, wherein the virtual user-configured music room includes at least one of artworks, logos, writings, and other items to personalize the virtual user-configured music room.

20. A non-transitory computer-readable storage medium storing a computer program to manage access to digital content in a virtual environment using virtual content rights, the computer program comprising executable instructions that cause a computer to:
provide a virtual content rights database comprising data associating a user of the virtual environment with the virtual content rights acquired with respect to the digital content;
receive a request from a device of the user for assignment of the virtual content rights of the digital content, wherein the user uses the device to interface with the processor;
update the virtual content rights database to indicate the assignment of the virtual content rights to the user;
receive data from the device of the user holding the virtual content rights to digital content including songs to create a virtual user-configured music room having at least one of the songs; and
update the virtual content rights database to indicate sharing of the virtual user-configured music room by the user within the virtual environment.

* * * * *